ively pure triethanolamine alginate.

UNITED STATES PATENT OFFICE 2,158,486

AMINE ALGINATE PRODUCT AND PROCESS

Bennett Preble, National City, Calif., assignor to Kelco Company, Los Angeles, Calif., a corporation of Delaware No Drawing. Application October 22, 1935, Serial No. 46,213

11 Claims. (Cl. 260—116)

This invention provides new alginate products and processes of producing same. Its principal object is to produce water soluble hydroxy amine alginate compositions by mixing alginic acid with a water soluble hydroxy amine in their respective combining proportions to form a product having many novel and valuable properties, rendering it useful for many purposes in the arts.

I have discovered that triethanolamine, diethanolamine and monoethanolamine may be used in producing water soluble products from alginic acid. Furthermore, since triethanolamine is a hydroxy amine, other hydroxy amines, such as tripropanolamines, dipropanolamines and monopropanolamines may replace any of the ethanolamines. Complicated hydroxy amines for example the butanolamines, may be used. In addition, amines other than hydroxy amines, for example, simple aliphatic, tertiary, secondary or primary amines, such as tripentyl amines, dipentyl amines and monopentylamines, also substituted amines, including chlorinated amines, may replace triethanolamine. These replacements of ethanolamines may be complete or partial or may be made by more than one amine.

Commercial monoethanolamine is principally $NH_2C_2H_4OH$ (2-amino-ethanol); commercial diethanolamine is mainly $NH(C_2H_4OH)_2$; and commercial triethanolamine is mainly $N(C_2H_4OH)_3$- ($\beta,\beta',\beta''$-trihydroxytriethylamine). The commercial grade of each of these contains a small amount of the other two, but so far we have found the best results are obtained for our purposes when using triethanolamine.

When technical triethanolamine and alginic acid are mixed in the approximate proportions of their respective equivalent weights a neutral product is obtained and hence the reaction which occurs when alginic acid and triethanolamine are mixed is probably expressed, as far as I have at present been able to ascertain, by the following theoretical equation:

The alginic acid used in manufacturing this composition may be any alginic acid, although I prefer that manufacture by the method disclosed in the Thornley & Walsh U. S. Letters Patent No. 1,814,981 issued July 14, 1931; or the Clark & Green application Serial No. 693,891, filed October 16, 1933; or the Green application Serial No. 721,829, filed April 21, 1934, since the alginic acid made by any of the said methods is relatively pure.

The following is one method for preparing the composition:

(A) Approximately 1000 lbs. of wet alginic acid manufactured by the method disclosed in the above mentioned Clark and Green application, Serial No. 693,891, is placed in a dough or other suitable paste mixer. This acid would contain about 10% (or 100 lbs.) of dry material if all the water were evaporated. The mixer is started and approximately 80 lbs. of commercial triethanolamine is added slowly. The triethanolamine reacts almost immediately on the fibrous mass in the mixer to produce a stiff or heavy paste. After about 30 minutes of mixing the reaction is complete and a dilute solution of the paste will have a pH value of approximately 7. This composition is relatively pure triethanolamine alginate.

Triethanolamine alginate paste in comparison with pastes made from gums, gelatin, casein, etc., will not spoil easily since it is resistant to the action of molds and micro-organisms which produce liquefaction and decay, and therefore molds grow or develop thereon very slowly; and such paste, if stored at temperatures below 40 degrees Fahrenheit or if some preservation such as formaldehyde is added thereto, may be preserved indefinitely.

To obtain an ethanolamine alginate composition of desired consistency, I may use an acid whose ammonia salt when in a 2% aqueous solution has a viscosity ranging from one to several

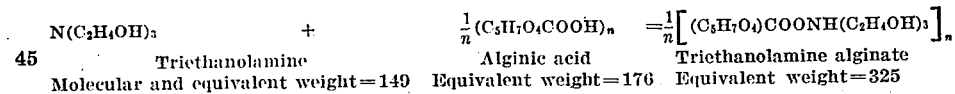

| $N(C_2H_4OH)_3$ | + | $\frac{1}{n}(C_5H_7O_4COOH)_n$ | $=\frac{1}{n}\left[(C_5H_7O_4)COONH(C_2H_4OH)_3\right]_n$ |

Triethanolamine     Alginic acid     Triethanolamine alginate
Molecular and equivalent weight=149    Equivalent weight=176    Equivalent weight=325

The triethanolamine I have used in the manufacture of this composition is a commercial grade made by the Carbide and Carbon Chemical Corporation, and consists of about 87% triethanolamine, 11% diethanolamine and 2% monoethanolamine.

thousand seconds, as measured by the Woolwich viscosity test. This test measures the time required for a $\frac{1}{16}$ inch diameter steel ball to fall 15 centimeters at 20° centigrade. Specific examples of how the viscosity of our triethanolamine alginate may be controlled are given in the following table showing how different acids give triethanolamine alginates of different viscosities:

| Alginic acid whose 2% ammonium salt gives a viscosity of— | Resulting triethanolamine alginate whose 2% solution gives a viscosity of about— |
|---|---|
| 25 | 4 |
| 82 | 12 |
| 90 | 13 |
| 95 | 14 |
| 1000 | 100 |
| 10000 | 800 |

A triethanolamine alginate having 4 seconds viscosity on a 2% solution will dry to produce a good film, whereas a triethanolamine alginate with 800 seconds viscosity would have to be diluted to such an extent that the resulting film would not give the desired results. Triethanolamine alginate having a higher viscosity is more desirable for some purposes, such as for producing a stronger film. Moreover, a high viscosity triethanolamine alginate has less tendency to run off the surface to which it is applied before becoming dry.

(B) In one method in which ammonia may replace part of the triethanolamine to control the consistency and nature of a dried film approximately 1000 lbs. of wet alginic acid manufactured by the Clark & Green method (application Ser. No. 693,891) is placed in a dough mixer as described in example (A), and 70 lbs. of commercial triethanolamine is slowly added along with 10 lbs. of 26° Baumé aqua ammonia. After about 30 minutes of mixing (different types of mixers will naturally require more or less time) the resulting product as a pH between 7 and 8 is an ammonium-triethanolamine alginate. This gives a film of medium pliability which dries faster.

When it is desired to produce a composition having a softer and more flexible film, this may be done by adding more than the combining chemical equivalent weight of triethanolamine so that the pH of a water solution of the paste is higher than 7. We have found 8.0 pH particularly useful.

Sometimes when a smaller amount of triethanolamine is used so that the pH of the resulting paste is 6.0 or below such composition is a stiffer paste or has a higher viscosity for a given concentration than one say of 7.0 pH and therefore has certain advantages for particular uses.

The pH of these triethanolamine alginate products will range between pH 3 and pH 11.

When a film of triethanolamine alginate is dried it is smooth, soft and flexible, and feels plump to the fingers, is strong, and will not crack when bent sharply, and is readily soluble in water but insoluble in oils and greases.

The above enumerated properties are in sharp contrast to those of other alginate salts, such as sodium or ammonium alginates, which form relatively brittle hard films which will crack when bent sharply and which therefore cannot be successfully utilized. Because of its strongly adhesive properties the triethanolamine alginate may be used for coating practically all solid surfaces such as cheese, meats and other food products, glass, metals, wood, plastics, ceramic ware and plaster.

For greater ease in shipping and handling the triethanolamine alginate may be produced in a dry form by putting the pastes hereinbefore described in a mechanical drier of any conventional type, such as a drum drier. After drying, the product is reduced by means of a chopper or mill to a particle size that can be conveniently dissolved in water. In some cases the paste might be converted into a dilute solution and then dried by means of a spray drier.

*Dry product*

(C) The following is one method for producing the product in dry form: Approximately 1000 lbs. of wet alginic acid is placed in a tank and diluted with water to about 1000 gallons. This mixture is then agitated while 80 lbs. of triethanolamine is added. The result is about a 2% solution of triethanolamine alginate. This mixture is then spray dried to give a fine powder containing 80% triethanolamine alginate and 20% water.

(D) Triethanolamine alginate may be produced by first drying the alginic acid and then adding triethanolamine to it; as for example: Approximately 1000 lbs. of wet alginic acid containing about 10% (or 100 lbs.) of dry material (if all the water was evaporated) is placed on trays and set in the sun until dried down to about 125 lbs. This material is ground to pass through a 30 mesh screen, and then placed in a mixer, and 90 lbs. of triethanolamine added, resulting in very stiff crumbly material having a pH of about 9.5 when made into a 2% solution. This method takes longer to complete, but produces a good composition. This method reduces the viscosity of the product as drying the alginic acid reduces the viscosity of the resulting salts made from the acid, which reduction in viscosity is probably due to the depolymerization of the alginic acid.

I have also found that by mixing dextrin with triethanolamine alginate paste prior to drying, the drying time can be shortened, and the product is more brittle and grinds easier, and will go into solution faster.

I have also found that the addition of sucrose increases the adhesive properties under certain conditions and also increases the ease of solution. Besides sucrose and dextrin, other substances which do not react with or precipitate alginates may be used. Among these are starch, glucose, fructose, maltose, zylose, glycerin, or mixtures of these with each other; also gelatin and glue when so treated that they will not react with the triethanolamine alginate, may be used. Instead of glycerin I may add other polyhydroxy compounds, such as sorbitol or some dihydroxy compound such as ethylene glycol, propylene glycol, or other glycol.

It is possible to replace a part of the triethanolamine by other basic substances and produce a composite composition containing some sodium, ammonium, aluminum, zinc, potassium or alkali earth metals.

The dried triethanolamine alginate product can be made to dissolve in water even when calcium salts or other salts which form insoluble alginates are present, by adding to the triethanolamine an amount of trisodium phosphate equivalent to 4 to 10 percent of the weight of the anhydrous alginic acid. In place of trisodium phosphate its equivalents may be used, such as disodium phosphate, ammonium phosphate, sodium carbonate, and other salts of acids which form insoluble calcium salts.

If desired a preservative may be incorporated in the composition; for example—

(E) Approximately 1000 lbs. of wet alginic acid is placed in a dough mixer and 60 lbs. of triethanolamine is added to form a wet paste containing partially neutralized alginic acid. The pH of such a paste is approximately 6. To this paste 1-1½ lbs. of formaldehyde is added as a preservative. Besides formaldehyde, other preservatives, including sodium benzoate, phenol, sodium phenyl phenolate, may be used.

I have also found that it is possible to replace part of the triethanolamine by other basic substances and produce a composite composition containing some sodium, ammonium, potassium or other metal which could form a water soluble alginate salt. Furthermore, combinations may be made with metals which form water insoluble alginates such as zinc, calcium, aluminum, copper or the like. In such a compound, one or more of the acidic hydrogen atoms of the complicated alginic acid molecule $(C_5H_7O_4COOH)_n$ may be replaced by one of the metals above, instead of being combined with triethanolamine to form $-COONH(C_2H_4OH)_3$.

My triethanolamine alginate product has certain properties which have special merit and is superior to competitive materials, these properties being: (1) that a film is flexible and elastic; and (2) that a film is water-soluble and swells immediately when brought into contact with water and slowly goes into complete solution or dispersion in the water.

I claim:

1. A mixed salt of alginic acid consisting of inorganic substances and ethanolamine of the formula $A(x)_n(y)_n$ where A is the radical of alginic acid, selected from the group which consists of the alkali metals, the alkaline earth metals, zinc, aluminum, and copper, $y$ is ethanolamine, and $n$ is a whole number consistent with the basicity of the acid and the remaining substances.

2. A mixed ammonium-ethanolamine salt of alginic acid.

3. A mixed ethanolamine-alkaline earth salt of alginic acid.

4. A water soluble chemical compound of alginic acid with definite stoichiometric proportions of ethanolamine and a metal chosen from the group of metals consisting of the alkali metals, the alkaline earth metals, zinc, aluminum, and copper which normally form insoluble salts with alginic acid.

5. A water soluble chemical compound of alginic acid with definite stoichiometric proportions of triethanolamine and a metal chosen from the group of metals consisting of the alkali metals, the alkaline earth metals, zinc, aluminum, and copper which normally form insoluble salts with alginic acid.

6. The process of preparing a mixed ammonium-ethanolamine salt which comprises mixing wet alginic acid, ammonium hydroxide solution, and triethanolamine, and agitating the mixture until chemical combination occurs.

7. The process of preparing mixed ethanolamine alginate which comprises mixing moist alginic acid, ethanolamine and aqua ammonia, agitating the mixture until it becomes a paste, and drying the paste.

8. The process of preparing mixed triethanolamine-alginate which comprises mixing moist alginic acid, triethanolamine and an ammonium salt of a weak volatile acid and agitating the mixture until chemical combination occurs.

9. The process of preparing mixed ammonium triethanolamine-alginate which comprises mixing moist alginic acid, triethanolamine and ammonium carbonate and agitating the mixture until chemical combination occurs.

10. The process of preparing mixed ammonium triethanolamine-alginate which consists in thoroughly mixing approximately 1000 pounds of wet alginic acid containing 10 percent alginic acid solids, approximately 70 pounds of triethanolamine-alginate, and 10 pounds of approximately 26 degree Baumé aqua ammonia.

11. The process of manufacturing mixed ethanolamine salts of alginic acid and metals which comprises mixing moist alginic acid, ethanolamine and a hydroxide of a metal selected from the group which consists of the alkali metals, the alkaline earth metals, zinc, aluminum, and copper, each in its stoichiometric proportion, and agitating the mixture until chemical combination occurs.

BENNETT PREBLE.